(12) United States Patent
Tenold et al.

(10) Patent No.: US 8,485,336 B2
(45) Date of Patent: Jul. 16, 2013

(54) COMPOSITE CHUTE LINERS

(75) Inventors: Tyrus Neil Tenold, Spokane, WA (US); Gregory George Tenold, Spokane, WA (US); Robert Gordon Tenold, Spokane, WA (US); Michael Joseph Gilman, Spokane, WA (US); Rod Alan Grozdanich, Liberty Lake, WA (US)

(73) Assignee: Spokane Industries, Spokane, WA (US)

( * ) Notice: Subject to any disclaimer, the term of this patent is extended or adjusted under 35 U.S.C. 154(b) by 499 days.

(21) Appl. No.: 12/789,272

(22) Filed: May 27, 2010

(65) Prior Publication Data

US 2011/0290616 A1 Dec. 1, 2011

(51) Int. Cl.
*B65G 11/16* (2006.01)
*B65G 47/44* (2006.01)

(52) U.S. Cl.
USPC ............ 193/33; 193/25 A; 193/25 E; 193/2 R

(58) Field of Classification Search
USPC ............ 193/2 R, 25 A, 25 E, 32, 33; 428/450
See application file for complete search history.

(56) References Cited

U.S. PATENT DOCUMENTS

| | | | | |
|---|---|---|---|---|
| 3,607,606 A | * | 9/1971 | Beninga | 428/67 |
| 4,529,660 A | * | 7/1985 | Heim | 428/423.1 |
| 5,037,784 A | * | 8/1991 | Raveau et al. | 501/134 |
| 5,429,312 A | * | 7/1995 | Ohno et al. | 241/34 |
| 5,705,250 A | * | 1/1998 | Hudson, Jr. | 428/99 |
| 5,735,377 A | * | 4/1998 | Herren | 193/33 |
| 6,279,715 B1 | * | 8/2001 | Herren | 193/33 |
| 6,399,176 B1 | | 6/2002 | Francois | |
| 6,520,241 B2 | * | 2/2003 | Francois | 164/97 |
| 6,601,789 B1 | | 8/2003 | Bajadali et al. | |
| 7,232,023 B2 | * | 6/2007 | Ellis et al. | 193/2 R |
| RE39,998 E | | 1/2008 | Francois | |
| 7,513,295 B2 | | 4/2009 | Poncin et al. | |
| 7,527,138 B1 | * | 5/2009 | Kemper | 193/33 |
| 7,588,134 B2 | * | 9/2009 | McKeough | 193/25 B |
| 7,820,299 B2 | | 10/2010 | Andreussi et al. | |
| 8,147,980 B2 | * | 4/2012 | Bhide | 428/545 |
| 2008/0179164 A1 | | 7/2008 | Sawall et al. | |

FOREIGN PATENT DOCUMENTS

| | | |
|---|---|---|
| JP | 07033964 | 6/1995 |
| JP | 2002180115 A | 6/2002 |
| KR | 20020049690 A | 6/2002 |
| KR | 100816510 B1 | 3/2008 |

OTHER PUBLICATIONS

The PCT Search Report mailed Dec. 9, 2011 for PCT application No. PCT/US11/31254, 9 pages.

* cited by examiner

*Primary Examiner* — Douglas Hess
(74) *Attorney, Agent, or Firm* — Lee & Hayes, PLLC

(57) ABSTRACT

Chutes and other components may include composite liners to improve performance. Composite liners generally comprise a base metal having a ceramic material embedded therein. The composite liners exhibit improved resistance to wear and, therefore, have a longer usable life than liners formed of the base metal alone.

30 Claims, 7 Drawing Sheets

COMPOSITE CHUTE LINERS

BACKGROUND

Conveyor systems have long been used in, for example, the mining industry to convey raw materials from a point of excavation to a more accessible location for refinement or processing. Such conveyor systems are subject to considerable wear from sliding abrasion of the conveyed materials with components of the conveyor system. Periodically, components of the conveyor system become worn to a point that they are no longer usable and need to be replaced. The conveyor system typically must be taken out of operation while the components are replaced. Depending on the size and accessibility of the component that is to be replaced, the downtimes for maintenance or replacement may be significant. This downtime while the conveyor system is not in operation results in lost productivity. Thus, mine operators strive to minimize the amount of time that conveyor systems are taken out of operation for maintenance or repair.

BRIEF SUMMARY

This Brief Summary is provided to introduce simplified concepts relating to composite liners, which are further described below in the Detailed Description. This summary is not intended to identify essential features of the claimed subject matter, nor is it intended for use in determining the scope of the claimed subject matter.

This disclosure relates to composite liners for components that are subject to wear (so called "wear parts"). The composite liners generally comprise a base metal having a ceramic material embedded therein. The composite liners exhibit improved resistance to wear and, therefore, have a longer usable life than liners formed of the base metal alone. Composite liners may be used to improve a usable life of virtually any wear part.

In one example, a material handling chute used to direct flow of material includes a composite liner. The material handling chute may be used, for example, to direct flow of ore in a conveyor system of a mining operation. The material handling chute in this example includes one or more chute liner modules coupled to a support structure. At least one of the chute liner modules comprises a composite including metal and ceramic material.

In another example, a composite chute liner module for lining a material handling chute may include a body having a wear surface. In this example, the body includes a base metal and one or more ceramic inserts embedded in the base metal over at least a portion of the wear surface.

In yet another example, a composite liner for material handling includes a body having a wear surface. The body includes a base metal and a ceramic material embedded in the base metal over at least a portion of the wear surface to improve resistance of the wear surface to sliding abrasion. By way of example, the composite liner of this example may be a chute liner of an ore chute for a mining operation or a belt skirt of a conveyor.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
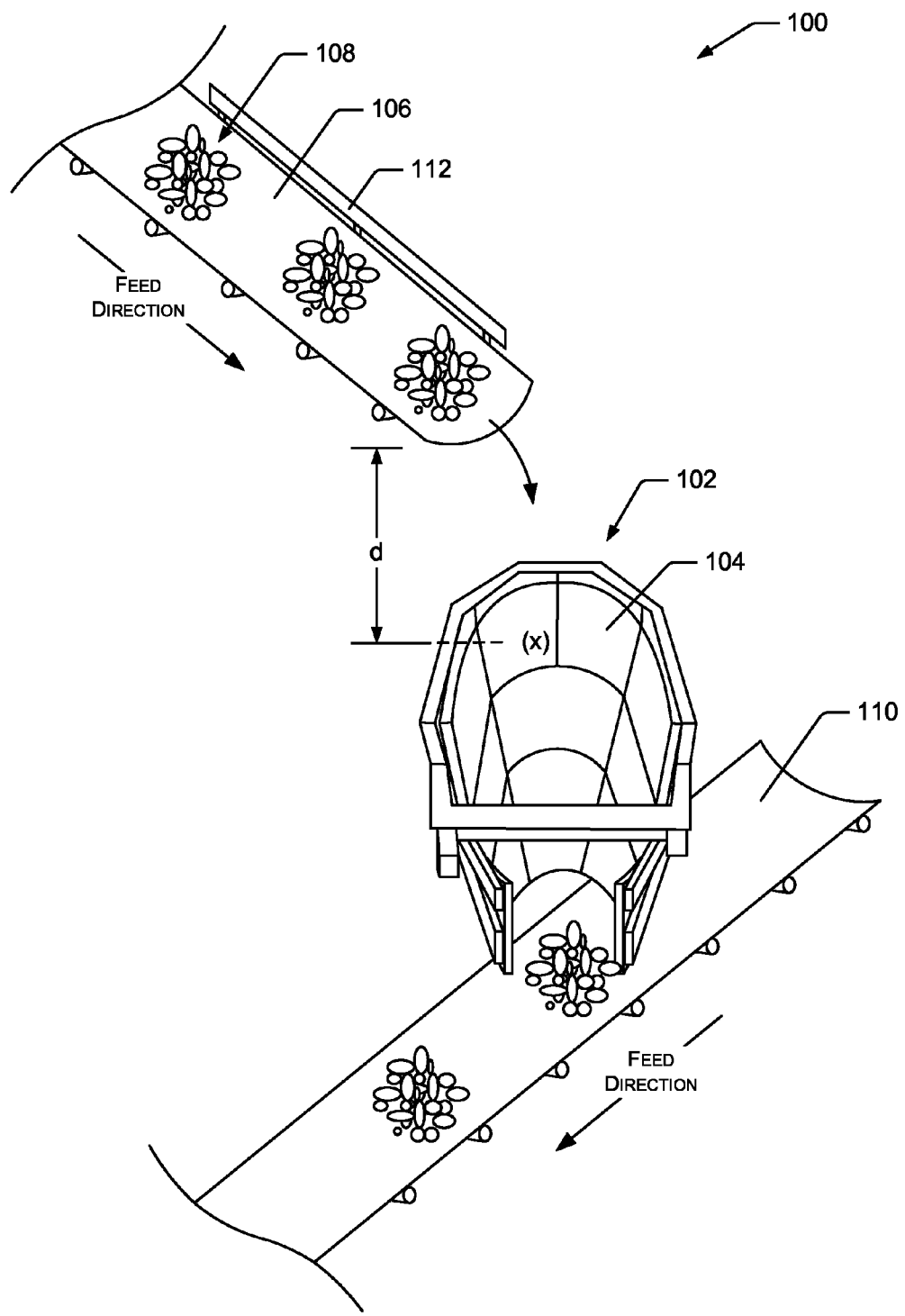
FIG. 1 is a schematic diagram of a conveyor system of a mining operation, which includes an illustrative ore chute having a composite liner.

As noted above, conveyor systems are subject to considerable wear from sliding abrasion of the conveyed materials with components of the conveyor system. Periodically, components of the conveyor system wear out and need to be replaced. This application describes composite liners that exhibit improved resistance to wear and, therefore, have a longer usable life than liners formed of the base metal alone.

Composite liners are described herein primarily in the context of liners for components of conveyor systems. However, the composite liners described herein may be used to improve a usable life of virtually any wear part. Moreover, while the liners described herein are described as being applicable in the mining industry, numerous other industries may also benefit from the liners described herein. By way of example and not limitation, the composite liners described herein may be used in the fields of excavation, manufacturing, metallurgy, milling, material handling, transportation, construction, military applications, and the like.

In general, composite liners as described in this application include a base metal and one or more ceramic materials. In some embodiments the ceramic materials are embedded in the base metal in the form of inserts formed of ceramic particles held together with an adhesive, while in other embodiments the ceramic materials may comprise loose particles or grains of ceramic material embedded in the base metal.

The embodiments described herein employ iron, carbon steel, or an alloy of iron or steel, as the base metal. However, in other embodiments, other metals may be used such as, for example, aluminum, stainless steel, copper, nickel, alloys of any of these, or the like. Also, while the embodiments described herein employ alumina and/or zirconia as the ceramic material, other ceramic materials may also be used such as, for example, tungsten carbide, titanium carbide, zirconia-toughened alumina (ZTA), partially stabilized zirconia (PSZ) ceramic, silicon carbide, silicon oxides, aluminum oxides with carbides, titanium oxide, brown fused alumina, combinations of any of these, or the like. Moreover, while the embodiments discussed herein describe using relatively small particles of ceramic materials (e.g., having a particles size in the range of about 0.03 inches to about 0.22 inches, about 0.7 mm to about 5.5 mm), the ceramic materials could alternatively be provided in other sizes (e.g., larger or smaller particles) or forms (e.g., precast unitary inserts as opposed to inserts formed of small particles).

In addition to improving the useable life of wear parts, the composite liners described herein may also weigh less than a solid metal part of comparable size and shape due to some of the base metal being displaced by lower density ceramic material. Composite liners may also exhibit more uniform and/or predictable failure modes than comparable solid metal parts.

These and other aspects of the composite liners will be described in greater detail below with reference to several illustrative embodiments.

Conveyor System with Illustrative Chute Having Composite Liner

FIG. 1 is a schematic diagram of a conveyor system 100 of a mining operation, which includes an illustrative ore chute 102 having a composite liner 104. The conveyor system 100 includes a first conveyor belt 106 that is feeding ore or other raw material 108 in a feed direction. The chute 102 is provided to direct or redirect the feed direction of the raw material 108. That is, raw material 108 is fed from conveyor 106 into the chute 102, which directs the raw material 108 onto a second conveyor 110 which is moving in a second feed direction. As the raw material 108 is fed into the chute 102, the raw material 108 drops a distance (d), impacts the liner 104 at a location (x), and slides against the composite chute liner 104 onto the second conveyor belt 110. While the point of impact (x) is shown in one example location in FIG. 1, the point of impact (x) may vary depending on the position and orientation of the chute 102 and other surrounding components of the conveyor system 100.

In the illustrated example, the chute 102 has an overall height of between about 10 and about 15 feet (about 3 to about 4.5 meters), and the distance (d) is about 20 feet (about 6 meters). However, in other examples, the height of the chute and the distance (d) may be greater or less than those specified.

In some embodiments, the conveyor system 100 may also include one or more other composite components. Any component that is subject to sliding abrasion or other modes of wear may benefit from the composite liners described herein. For example, the first conveyor belt 106 in FIG. 1 is shown as having a composite belt skirt 112 lining the conveyor belt.

Figure 2:
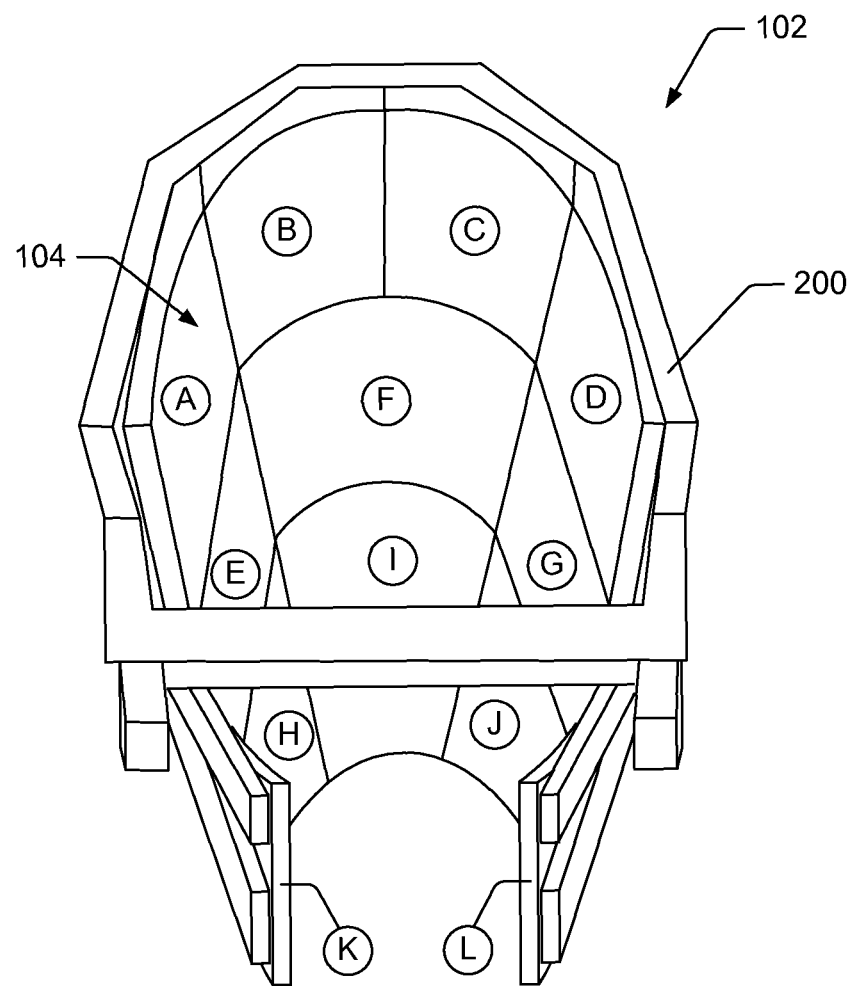
FIG. 2 is an enlarged perspective view of the ore chute of FIG. 1.

FIG. 2 is an enlarged perspective view of the ore chute 102 of FIG. 1, showing the composite chute liner 104 in more detail. As shown in FIG. 2, the composite liner 104 of the ore chute 102 in this embodiment is composed of multiple concave chute liner modules A-L, which fit together to define a smooth, concave wear surface against which the raw material 108 slides. The composite chute liner modules A-L are coupled to a support structure 200. In this embodiment, the support structure 200 comprises a framework of carbon steel to which the composite chute liner modules are removably fastened. The support structure 200 couples the chute 102 in place relative to the ground, a building, or some other superstructure. In some embodiments, the support structure may be fixed, while in other embodiments the support structure may be adjustable to adjust the orientation and/or position of the chute 102 relative to other components of the conveyor system 100.

Figure 3:
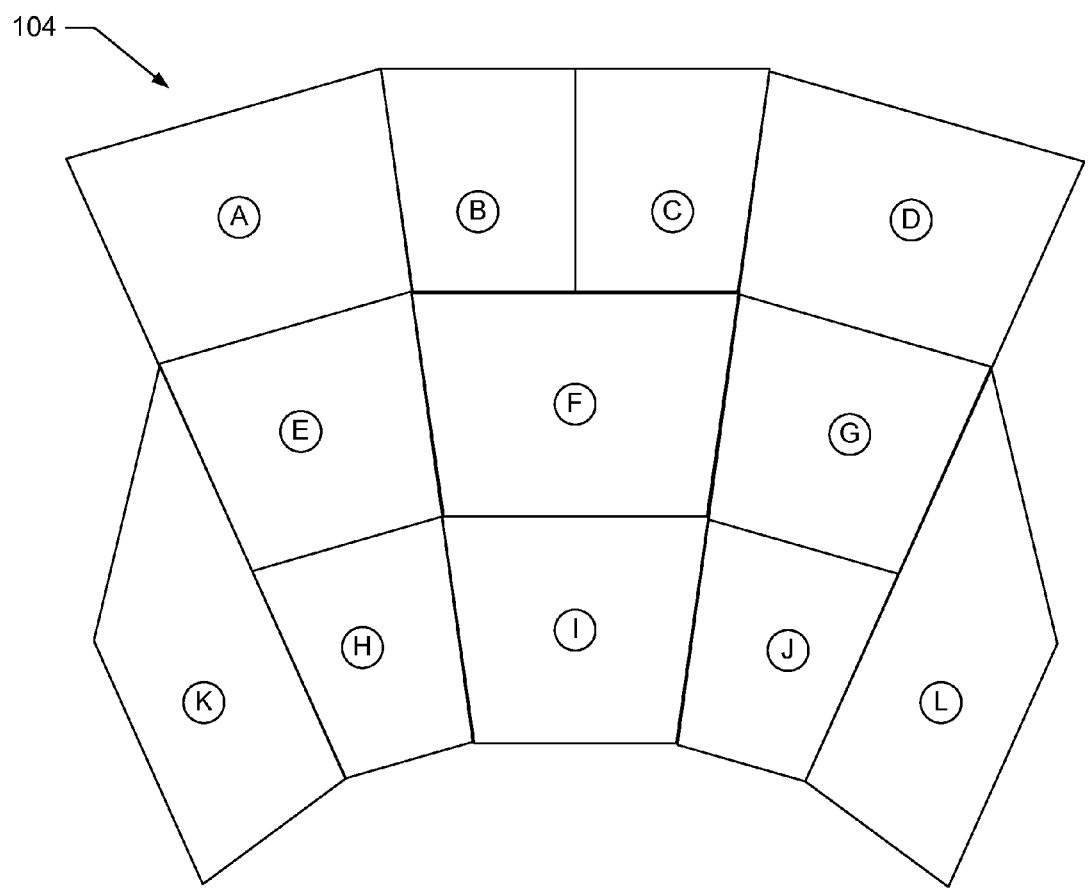
FIG. 3 is a schematic diagram of the composite liner of the ore chute of FIG. 1, flattened to better illustrate composite chute liner modules A-L of which the composite liner of this embodiment is composed.

FIG. 3 is a schematic diagram of the composite chute liner 104 of FIG. 1, shown in a flattened view to better illustrate the composite chute liner modules A-L.

In some embodiments, chute liner modules A-L may all comprise composite chute liner modules. However, in conventional ore chutes, the various parts of the ore chute do not wear evenly. Rather, the ore chutes tend to wear the most at areas where the raw material impacts the liner (e.g., at x in FIG. 1) and where the greatest volume of material tends to slide. These high-wear areas tend to wear out much more quickly than other areas of the conventional ore chutes. Thus, in other embodiments, only certain chute liner modules (e.g., those in the highest wear areas) may be configured as composite chute liner modules, while lower wear areas may be configured as conventional, non-composite (i.e., solid metal) chute liners. In one specific embodiment, chute liner modules B, C, F, and I may comprise composite chute liner modules, while chute liner modules A, D, E, G, H, J, K, and L comprise non-composite chute liner modules. In this way, the entire chute liner may be designed to wear more evenly while the overall usable life of the chute liner is increased.

The chute liner 104 in the illustrated example is shown as comprising twelve chute liner modules (i.e., A-L). By way of example and not limitation, chute liner modules B and C may have dimensions of roughly 34 inches wide×45 inches high×5 inches thick (86 cm×114 cm×13 cm), chute liner module F may have dimensions of roughly 52 inches wide×42 inches high×5 inches thick (132 cm×107 cm×13 cm), and chute liner I may have dimensions of roughly 33 inches wide×52 inches high×5 inches thick (84 cm×132 cm×13 cm). Thus, each chute liner module may weigh on the order of 2000 pounds (900 kg) or more. However, smaller chute liner modules that weight less than 2000 pounds may additionally or alternatively be used. Moreover, other chute liners may include other numbers, sizes, shapes, and configurations of chute liner modules.

The composite chute liner modules described herein have a significantly longer usable life than comparable solid metal chute liner modules. For example, in some embodiments, composite chute liner modules may last 50-100% longer than comparable solid metal chute liners. In some instances, composite liners may more than double the usable life of a component as compared to conventional solid metal parts.

Illustrative Composite Chute Liner Modules

Figure 4:
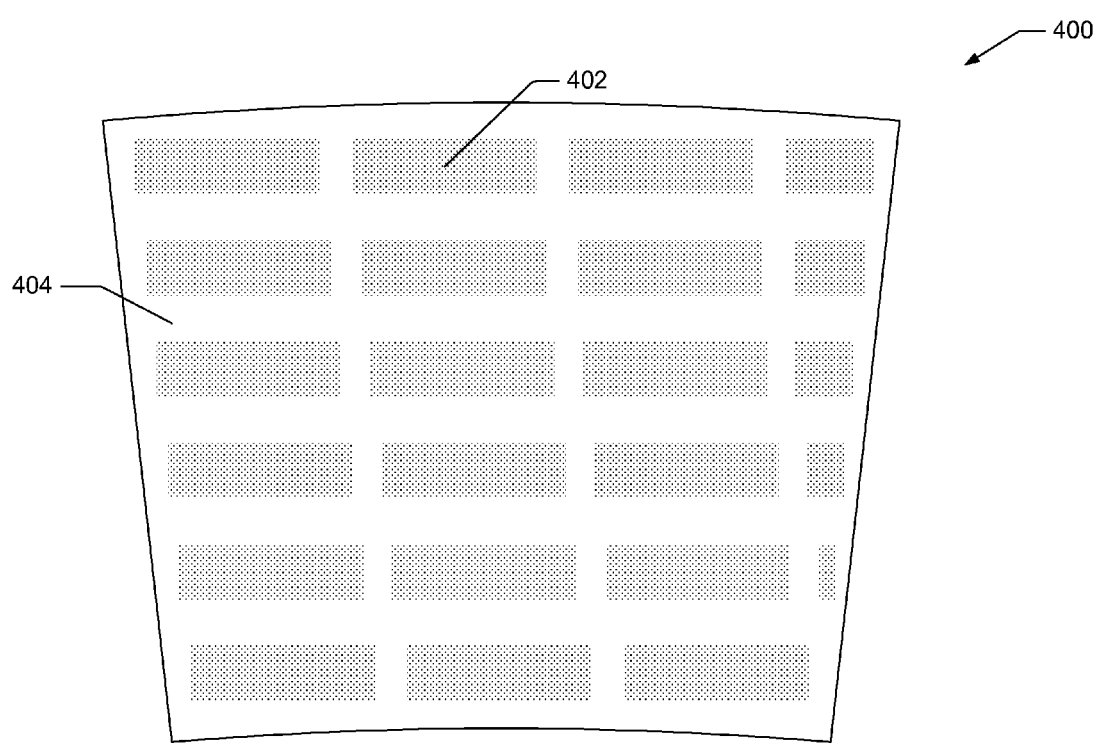
FIG. 4 is a schematic front view showing an illustrative arrangement of multiple ceramic inserts embedded within a composite chute liner module.
Figure 5:
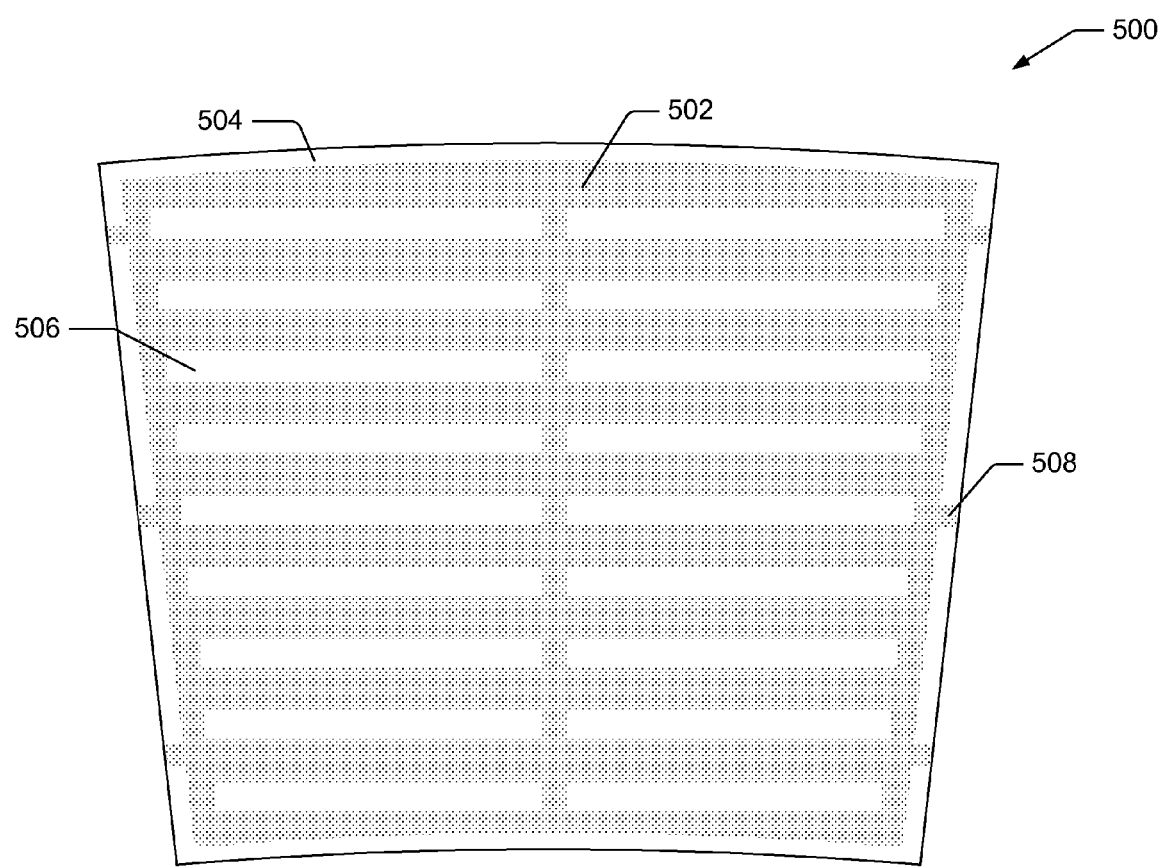
FIG. 5 is a schematic front view showing another illustrative arrangement including a single ceramic insert embedded within a composite chute liner module.

FIGS. 4 and 5 illustrate two alternative embodiments of composite chute liner modules. FIG. 4 is a schematic front view showing one example arrangement of embedding ceramic material in a composite chute liner module 400. In this embodiment, multiple ceramic inserts 402 are embedded in base metal 404 in a wear surface (the front surface in this embodiment) of the composite chute liner module 400. The ceramic inserts 402 may be formed in a variety of different ways. In one example, the ceramic inserts each comprise a porous body of ceramic particles formed into a desired shape and held together by an adhesive. Alternatively, the inserts could be precast as a single piece, using conventional ceramic manufacturing techniques. In that case, the desired porosity could be achieved by forming small channels within the insert. In either case, the porosity should be such that the base metal can substantially permeate interstitial spaces in the porous body of the insert during casting of the chute liner module 400.

As discussed above, various different ceramic materials may be used for the inserts. In one embodiment, the ceramic inserts comprise ceramic particles made of alumina and zirconia. The relative content of alumina and zirconia of the ceramic material may vary depending on the desired toughness, hardness, and thermal expansion characteristics of the ceramic inserts. In general, increasing an amount of alumina will increase a hardness of the insert, while increasing an amount of zirconia will increase the toughness. In addition, zirconia has a coefficient of thermal expansion that closely matches that of iron and steel and, therefore, minimizes internal stresses and cracking of the composite components. These ceramic grains may be manufactured by any known technique, such as by electrofusion, sintering, flame spraying, or by any other process allowing the two constituents (alumina and zirconia) to fuse. Additionally, the size and shape of the ceramic particles may vary. In some embodiments, the particles may range in size from about 0.03 inches to about 0.22 inches (about 0.7 mm to about 5.5 mm). However, in other embodiments, larger and/or smaller particles may be used.

The ceramic particles are mixed with an adhesive and placed into an insert mold to form the ceramic material into a desired shape for the inserts 402. The adhesive may be inorganic or organic. Once the inserts 402 have set, they may optionally be preheated prior to casting the chute liner module or other component. The preheating removes moisture from the inserts. In addition, preheating the inserts 402 helps facilitate permeation of the molten metal into the porous inserts by minimizing the chilling effect the insert has on the molten metal during the casting process.

Due to the size of the parts and the quantity of metal being cast (each chute liner module weights on the order of 2000 pounds/900 kg or more), the force of the molten metal entering the mold has a tendency to move the inserts during the casting process. To minimize this effect, during the casting process, the inserts may be held in place by suitable known support structures.

Depending on the specific application and design considerations, different numbers, sizes, and/or shapes of inserts may be used. In some embodiments, multiple ceramic inserts may be arranged in the wear surface of the composite chute liner module. There is no limit to an amount of the wear surface that may have ceramic inserts embedded therein. Typically, ceramic inserts may be disposed in at least about 10% and at most about 90% of the wear surface of the composite chute liners. In some embodiments, ceramic inserts may be disposed in at least about 20% to at most about 80% of the wear surface of the composite chute liners. In other embodiments, ceramic inserts may be disposed in at least about 40% of the wear surface of the composite chute liners. However, in other embodiments, ceramic inserts may be arranged in greater or lesser areas of the composite chute liners. For example, in embodiments in which wear is localized, inserts may be disposed in more limited portions of the wear surface. Also, while the inserts are shown in FIG. 4 to be uniformly distributed throughout the composite chute liner modules, in other embodiments, the ceramic inserts may be centralized or grouped in certain areas, such as high wear areas. For example, a composite chute liner module might have ceramic inserts located only in a central region of the module or only in one side of the chute liner module.

FIG. 5 is a schematic front view showing another illustrative arrangement including a single ceramic insert embedded within a composite chute liner module 500. In this example, instead of having multiple ceramic inserts embedded in the composite chute liner module 500, a single ceramic insert 502 is embedded in the base metal 504. The single insert may be formed so as to approximate the shape of the composite chute liner module 500, as shown in FIG. 5, or may be formed in any other desired shape. In this embodiment, the insert may include one or more spaces or passages 506 to facilitate flow and penetration of the molten metal 504 during the casting process. The size and shape of the passages 506 may be sized to facilitate good permeation of the base metal 504 into the porous insert 502, while still providing ceramic material at the desired locations and in the desired amounts in the composite chute liner module 500. As in the embodiment of FIG. 4, the ceramic insert of this embodiment may be embedded to cover at least about 10% to at most about 90% of the wear surface, at least about 20% to at most about 80% of the wear surface, at least about 40% of the wear surface, or any other lesser or greater portion of the wear surface of the composite chute liner module 500.

The insert 502 shown in FIG. 5 also includes multiple supports 508 disposed on an exterior of the insert 502 to position the insert in a mold during casting of the chute liner module. The supports 508 may be formed integrally with the insert 502, or may be added to the insert. Alternatively, instead of the supports 508, the insert 502 may be held in place during casting by suitable known support structures.

Illustrative Lifting and Mounting Features of Composite Chute Liner Modules

Figure 6:
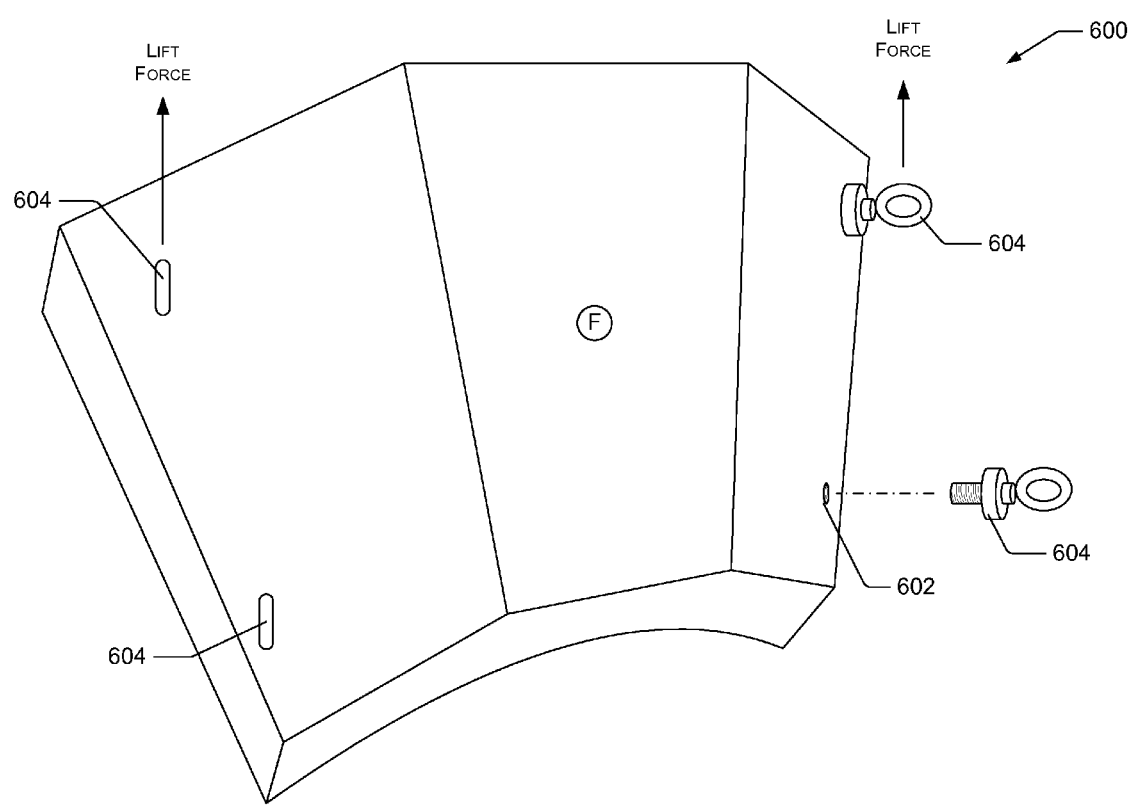
FIG. 6 is a rear perspective view of composite chute liner module F shown in FIG. 3.
Figure 7:
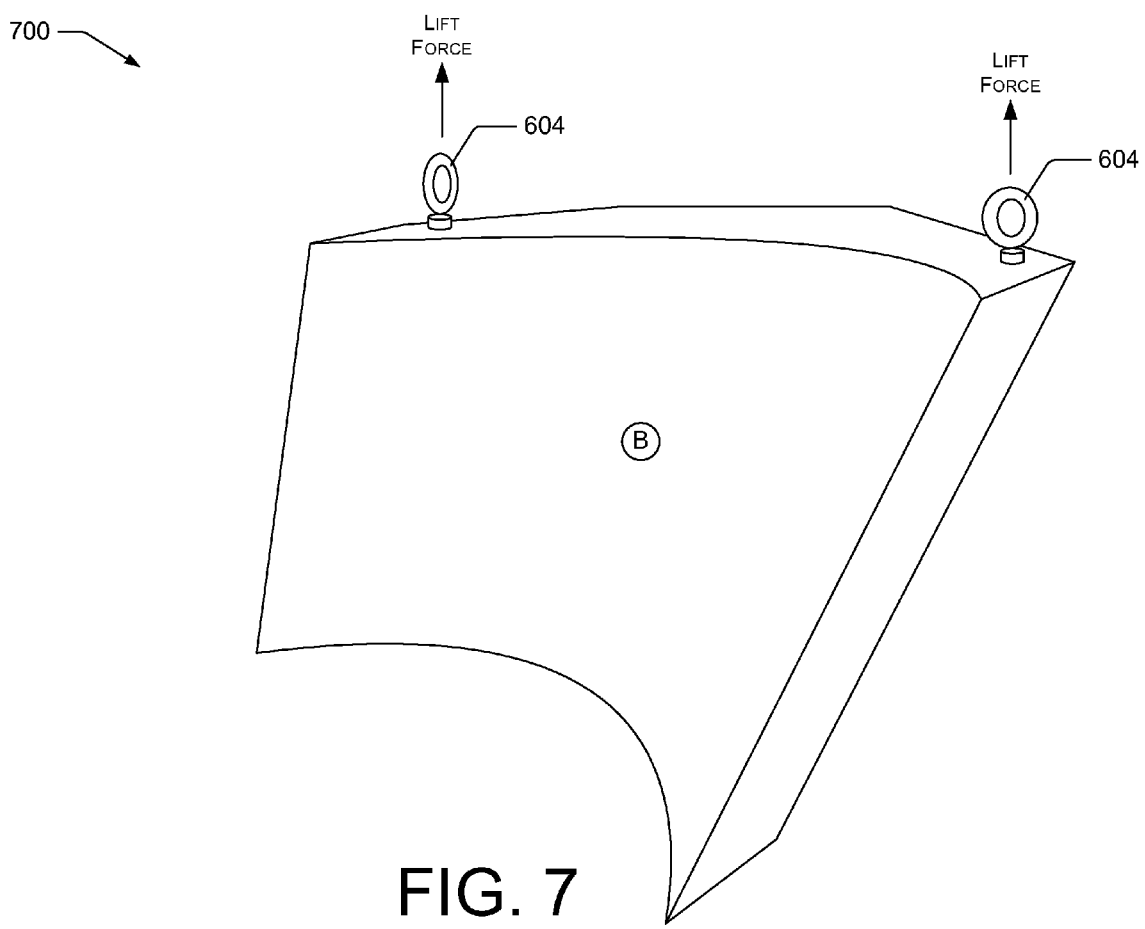
FIG. 7 is a front/side perspective view of composite chute liner module B shown in FIG. 3.

FIGS. 6 and 7 illustrate rear and side perspective view of illustrative composite chute liner modules 600 and 700, respectively. Specifically, FIG. 6 is a rear perspective view of composite chute liner module F shown in FIG. 3, and FIG. 7 is a front/side perspective view of composite chute liner module B shown in FIG. 3.

Conventional chute liners typically have through-holes in the wear surface to attach the chute liner modules to the support structure. These through-holes often are some of the first locations to wear out. As shown in FIGS. 6 and 7, the composite chute liner modules 600, 700 described herein include generally concave, smooth front surfaces (best seen in FIG. 7) that are free of through-holes and other discontinuities that contribute to premature wear. Rather, the composite chute liner modules 600, 700 include bores 602 that are threaded to receive mounting bolts or studs. Only one bore 602 is shown. However, each composite chute liner module 600, 700 may include multiple bores (as many as desired to securely attach the chute liner module to the support structure). The bores 602 are "blind" bores meaning that they extend only part of the way through the composite chute liner modules 600, 700. The bores 602 may be formed by casting them in the body of the composite chute liner modules 600, 700, and then inserting helical, threaded inserts into the cast bores. Alternatively, the bores 602 may be formed by drilling and tapping the holes, or by drilling holes and installing helical threaded inserts.

The composite chute liner modules 600, 700 also include one or more lifting elements 604, such as eye bolts, hooks, chain links, or other mechanisms that are usable to lift the composite chute liner modules 600, 700 for installation, transportation, maintenance, removal, or the like. The lifting elements 604 are disposed on the body of the composite chute liner modules 600, 700 at locations other than the wear surface. In the illustrated example, the lifting elements 604 comprise eye bolts that can be threaded into the bores 602 when needed (e.g., during installation), and then removed so that the bores 602 can be used to mount the chute liner modules 600, 700 to the support structure 200. The lifting elements 604 are positioned such that when the composite chute liner modules 600, 700 are lifted at these points, the composite chute liner modules 600, 700 hang at approximately the same orientation that they will be positioned for installation.

Illustrative Manufacturing Process

The composite components described herein can be made by a variety of manufacturing processes. In one example, the ceramic materials are placed in the sand mold according to one of the techniques described above. As noted above, the inserts may be preheated prior to casting to remove moisture and/or to elevate the temperature of the ceramic material to slow solidification of the base metal during the casting process for better permeation into the ceramic material. The composite component may then be formed by injecting molten base metal into molds using conventional sand casting techniques. Subsequently, the composite component may be subjected to one or more known post processing operations, such as machining, heat treating (e.g., quenching, annealing, cryogenic hardening, etc.), polishing, or the like.

Illustrative chutes, composite chute liner modules, and other components are described above. Certain features of these components can be modified, rearranged, and/or omitted entirely, depending on the circumstances. Likewise, any of the acts described above with respect to making such components may be modified, rearranged, and/or may be omitted.

CONCLUSION

Although the disclosure uses language specific to structural features and/or methodological acts, the claims are not limited to the specific features or acts described. Rather, the specific features and acts are disclosed as illustrative forms of implementing the invention.

What is claimed is:

1. A material handling chute to direct flow of material, the material handling chute comprising:
    a support structure; and
    at least one chute liner module coupled to the support structure, the at least one chute liner module comprising a composite material including metal and ceramic material, the ceramic material having been embedded in the metal by casting the metal at least partially around the ceramic material.

2. The material handling chute of claim 1, the chute comprising an ore chute in a mining operation.

3. The material handling chute of claim 1, the chute comprising multiple chute liner modules coupled to the support structure.

4. The material handling chute of claim 3, the multiple chute liner modules comprising the at least one composite chute liner module and at least one non-composite chute liner module.

5. The material handling chute of claim 1, the at least one chute liner module comprising a base metal and at least one ceramic insert embedded in the base metal.

6. The material handling chute of claim 5, the at least one ceramic insert comprising a porous body of ceramic particles, and the base metal substantially permeating interstitial spaces in the porous body of the at least one ceramic insert.

7. The material handling chute of claim 5, further comprising multiple ceramic inserts embedded in the base metal over at least a portion of a wear surface of the at least one chute liner module.

8. The material handling chute of claim 5, the at least one ceramic insert comprising a single insert embedded in the base metal and extending over at least a portion of a wear surface of the at least one chute liner module.

9. The material handling chute of claim 5, the at least one ceramic insert being embedded in the based metal over at least about 40% of a wear surface of the at least one chute liner module.

10. The material handling chute of claim 5, the at least one ceramic insert being embedded in the based metal over about 10% to about 90% of a wear surface of the at least one chute liner module.

11. The material handling chute of claim 1, the ceramic material comprising alumina and/or zirconia.

12. The material handling chute of claim 1, the at least one chute liner module being coupled to the support structure via one or more threaded attachment points of the at least one chute liner module.

13. A composite chute liner module for lining a material handling chute, the composite chute liner module comprising a body having a wear surface, the body comprising:
    a base metal; and
    at least one ceramic insert embedded in the base metal over at least a portion of the wear surface, the at least one ceramic insert comprising a porous body of ceramic particles and the ceramic insert having been embedded in the base metal by casting the base metal at least partially around the ceramic insert.

14. The composite chute liner module of claim 13, the wear surface of the body of the composite chute liner module having a concave surface.

15. The composite chute liner module of claim 13, the wear surface of the body of the composite chute liner module being free of through-holes.

16. The composite chute liner module of claim 13, further comprising at least one removable lifting element disposed on the body at one or more locations other than the wear surface.

17. The composite chute liner module of claim 13, the at least one lifting element being disposed at a location such that when the composite chute liner module is lifted via the lifting element, the composite chute liner module hangs approximately at an orientation at which it is to be installed.

18. The composite chute liner module of claim 13, the at least one lifting element comprising an eye-bolt coupled to the body by threaded engagement.

19. The composite chute liner module of claim 13, the base metal substantially permeating interstitial spaces in the porous body of the at least one ceramic insert.

20. The composite chute liner module of claim 13, further comprising multiple ceramic inserts arranged in the wear surface of the composite chute liner module.

21. The composite chute liner module of claim 13, the at least one ceramic insert comprising a single insert extending over at least about 10% of the wear surface of the composite chute liner module.

22. The composite chute liner module of claim 21, the single insert comprising one or more supports disposed on an exterior of the single insert to position the insert in a mold during casting of the chute liner module.

23. The composite chute liner module of claim 13, the ceramic insert comprising alumina and/or zirconia.

24. A composite liner for material handling, the composite liner comprising:
    a body having a wear surface, the body comprising:
        a base metal; and
        ceramic material embedded in the base metal over at least a portion of the wear surface to improve resistance of the wear surface to sliding abrasion, the ceramic material having been embedded in the base metal by casting the base metal at least partially around the ceramic material.

25. The composite liner of claim 24, wherein the composite liner comprises a chute liner of an ore chute for a mining operation.

26. The composite liner of claim 24, wherein the composite liner comprises a belt skirt of a conveyor.

27. The composite liner of claim 24, the ceramic material comprising ceramic particles, and the base metal substantially permeating interstitial spaces between the ceramic particles.

28. The composite liner of claim 24, the ceramic material disposed over at least about 40% of the wear surface of the composite liner.

29. The composite liner of claim 24, the ceramic material being disposed in at least about 10% of the wear surface of the composite liner.

30. The composite liner of claim 24, the ceramic material being disposed in at most about 90% of the wear surface of the composite liner.

* * * * *